Patented May 11, 1954

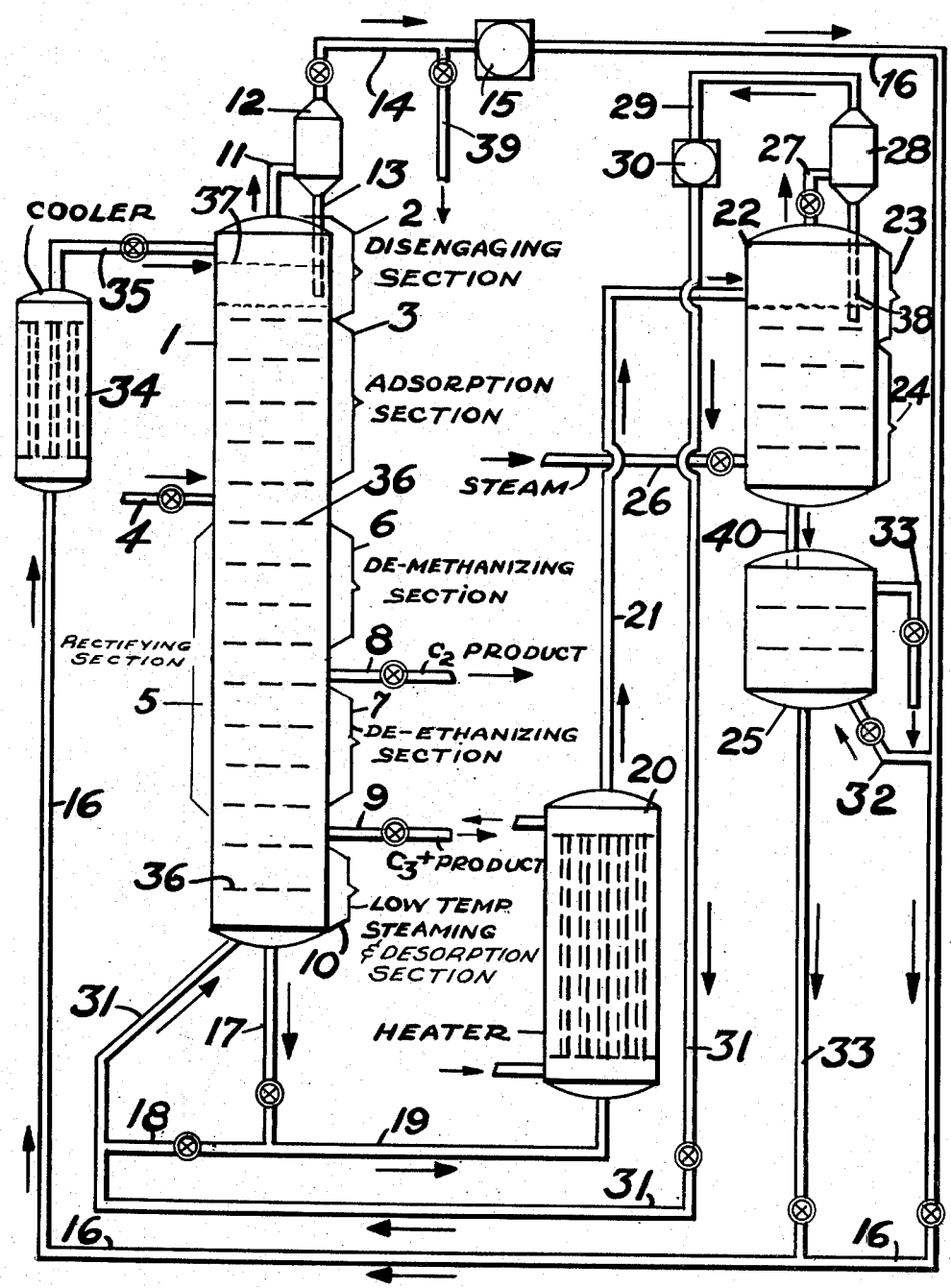

2,678,111

UNITED STATES PATENT OFFICE 2,678,111

FLUIDIZED ADSORPTION PROCESS

Henry J. Ogorzaly, Summit, N. J., assignor to Standard Oil Development Company, a corporation of Delaware Application May 11, 1949, Serial No. 92,661

5 Claims. (Cl. 183—114.2)

This invention relates to an improved continuous adsorption process employing fluidized solid adsorbents for the fractionation of components of a gaseous mixture in an adsorption tower by countercurrent contact of the gaseous mixture with the solid adsorbent. Specifically, the invention is concerned with the desorption and stripping of the rich adsorbent in a separate tower from that used for adsorption and rectification so that both the heating and the cooling of the adsorbent may be carried out in upflow fluid vessels.

The fractionation of a gaseous mixture by causing it to flow upwardly through an adsorption zone where it contacts an adsorbent material such as charcoal, silica gel, etc. in small particle or powdered form which is passed downwardly through this zone has already been described. The adsorbent leaving the bottom of the adsorption zone is heated, with or without contact with a stripping gas such as steam, to desorb the adsorbed component of the gas which is separately recovered. The stripped adsorbent is then dehydrated, if desired or necessary, cooled, and returned to the top of the adsorption zone for re-use.

In previously described continuous processes for the adsorptive separation of gases, feed gas constituents are adsorbed and rectified into various fractions in a countercurrent tower operation. The "reflux" vapor, which is returned to the bottom of the lower rectification zone, plus the bottoms product are desorbed by combined steam stripping and heating, and the hot stripped solid is carried by recycled tower overhead (lift) gas to a suitable cooling unit before entering the top of the adsorption section of the column to repeat the cycle.

Previously described processes for the separation of gaseous mixtures, e. g., light hydrocarbons, by adsorption on a selective solid adsorbent such as charcoal wherein the adsorbent is finely divided and maintained in a fluidized state during contact with the gaseous mixture have provided for a continuous downward flow of adsorbent through the adsorption, rectification and desorption stages. The desorbed char is then returned to the top of the adsorption tower by gas lift to repeat the cycle.

It has now been found advantageous to arrange for the separation of the stripping-desorption section of the tower from the adsorption and rectification sections. The particular advantage which accrues to this arrangement of equipment is that the heating of the solids required for desorption of the heavier components present on the adsorbent may be carried out in upflow heat transfer equipment which is particularly suitable for use with fluidized solids and which avoids cross flow and channelling which occurs with countercurrent downflow of fluidized solids across bubble plates equipped with heat exchange equipment, e. g., tube bundles.

Suitable apparatus for use in the process of this invention is shown diagrammatically in the attached drawing in which the single figure represents a sectional elevational view of one type of apparatus adapted to carry out the process.

Referring to the drawing the invention will be described for purposes of example only by the separation of $C_2$ and $C_3$ hydrocarbon from a fraction containing a mixture of $C_1$ to $C_3+$ and lighter gaseous components by means of charcoal adsorption. The numeral 1 represents an adsorption tower containing in descending order a tail gas removal line 14, an uppermost disengaging section 2, an adsorption section 3, a gas feed line 4, a rectification section 5 comprising a demethanizing section 6, a $C_2$ vapor removal line 8, and a de-ethanizing section 7. Below the de-ethanizing section there is located a steaming and desorption zone 10, a $C_3+$ vapor removal line 9, a solids withdrawal line 17, and a bottoms reflux entry line 31.

The feed gas comprising a mixture of hydrogen, methane, $C_2$ hydrocarbons, $C_3$ hydrocarbons and inerts is introduced under a pressure which may be for example about 75 p. s. i. gauge into the adsorption tower via line 4 at a point between the adsorption section and the rectification section. A mass of fluidized charcoal adsorbent cooled to approximately 100° F. to 200° F. is introduced into the top of the adsorption section of the tower at the disengaging section via line 35. The adsorption tower contains trays 36 spaced at regular intervals upon which the fluidized charcoal will build up and reach a level indicated by the numeral 37 before overflowing through downcomers to the next tray. The adsorbent passes down the tower at such a rate that substantially all the $C_2$ and heavier hydrocarbons are selectively adsorbed on the adsorbent within the adsorption section while the methane and lighter components, e. g., nitrogen and hydrogen, pass overhead via cyclone 12 and leave the tower via line 14. Entrained charcoal is returned from cyclone 12 to the tower via dip-leg 13. The charcoal passes down the tower into the rectification section 5 below the feed point. In the upper area of the rectification section the methane and lighter components which may have been adsorbed are stripped from the adsorbent surface by refluxing the adsorbent with $C_2+$ hydrocarbons which have been desorbed from the adsorbent at a lower point within the de-ethanizing section 7. The methane, nitrogen, hydrogen, etc. which may have remained on the adsorbent as it passes down through the tower into demethanizing section 6 are desorbed by the action of the refluxed $C_2+$ hydrocarbons due to the stronger adsorption on the charcoal of the heavier hydrocarbons. The displaced materials flow upwardly past the gas feed line 4 into the adsorber section and are eventually withdrawn from the system via line 14.

In the de-ethanizing section 7, the adsorbent is refluxed with the heavier components of the hydrocarbon feed, for example, the $C_3+$ hydrocarbons similarly released in the lower section of the tower by the action of the steaming section 10, whereby the desorption of the $C_2$ hydrocarbons is brought about. The $C_2$ hydrocarbons are removed in controlled amounts as a vapor stream from a point near the center of the rectification section via line 8 at a temperature which may be about 240° F.

The charcoal substantially free of $C_2$ and lighter components passes from the de-ethanizing section 7 into the steaming section 10 to which bottom reflux consisting principally of steam is fed at a temperature which may be about 500° F. via line 31. In the steaming section 10 desorption of the $C_3+$ hydrocarbons is accomplished by the refluxing action of the steam on the enriched charcoal. The action of the heat introduced with the steam together with the strong attraction of the adsorbent for steam at moderate temperatures disengages the $C_3+$ hydrocarbons from the adsorbent and they pass upwardly through the steaming section with the product portion taken out through line 9 at a temperature which may be about 350° F. The $C_3+$ stream contains appreciable amounts of water vapor which may be removed therefrom by appropriate cooling or quenching operation.

By providing a steaming and desorption section 10 below the bottoms product draw-off line 9 desorption of $C_3+$ hydrocarbons by steam is afforded. Section 10 may be operated at a temperature of about 330° F. to about 365° F. There is generous circulation of steam in this section and the water adsorption tendency is very great thus effecting desorption of the bulk of the bottoms product ($C_3+$ hydrocarbons) in very few stages before the heating step.

Charcoal is removed from the bottom of tower 1 via line 17, discharged into a stream of lift gas supplied via line 18, and is led via line 19 into the bottom of heater 20. The lift gas stream consists principally of steam. Heater 20 is equipped with tube bundles around which there may be circulated a high temperature condensing material such as diphenyl or a mixture of diphenyl and diphenyl oxide. The char may be heated to about 500–600° F. in the heater. The fluidized charcoal flows upwardly through the heater in a state of extreme turbulence affording the fluidized charcoal particles maximum opportunity to contact the heating elements without obstruction. The higher temperature prevailing in the heater causes the volatilization of the steam from the charcoal and with it some of the $C_3+$ hydrocarbons which may have remained thereon. Since co-current equilibrium between the total solid and vapor is the maximum which can be attained in the heater there may still be some traces of $C_3+$ hydrocarbons present on the charcoal which flows upwardly via line 21 together with the steam and desorbed $C_3+$ hydrocarbons. This mixture therefore is fed via line 21 into the top of vessel 22 which acts as a high temperature steaming section for final clean-up of the $C_3+$ hydrocarbons. Vessel 22 contains an upper disengaging section 23, and a steaming section 24. The hot charcoal and desorbed steam and $C_3+$ hydrocarbons enter vessel 22 at the disengaging section 23 wherein the steam and $C_3+$ hydrocarbon vapors are separated from the charcoal. The vapors pass upwardly via line 27 into cyclone 28 and out through line 29 to blower 30 in which they are repressured for use as lift gas via line 18 or reflux via line 31. Charcoal fines are separated from the vapors in the cyclone and returned to vessel 22 via dip leg 38. The descending charcoal passes countercurrently to steam entering vessel 22 by means of line 26 and during this passage at a temperature generally in the neighborhood of 500° F. the final traces of $C_3+$ hydrocarbons are stripped from the charcoal. The descending charcoal containing steam adsorbed thereon then flows downwardly through line 40 into dehydrating vessel 25 wherein it is countercurrently treated with dry tail gas from line 16 entering the bottom of vessel 25 via line 32. Wet tail gas is removed from the system via line 33.

The hot stripped charcoal from vessel 25 at a temperature of about 500° F. is removed via line 33 and circulated via gas lift line 16 with the assistance of dry tail gas to a cooling zone 34 through which the charcoal flows upwardly and is cooled to a temperature in the range of 100° F. to 200° F. The cooled charcoal enters the top of the disengaging section 2 via line 35. In the disengaging section the recycled tail gas employed as lift gas plus the net tail gas overhead from the adsorption zone are removed via line 11 while the charcoal descends into the tower to repeat the cycle.

In the process illustrated in the drawing the tail gas emerges from the adsorption tower via line 14 and is removed in part via line 39 as net product to a tail gas water scrubber or filter (not illustrated) where the remaining entrained charcoal of fine particle size is removed therefrom. The balance of the tail gas is repressured by blower 15 and employed as lift gas via line 16 to carry the desorbed hot charcoal through the cooling zone and back into the adsorption tower as described.

It is understood that during the adsorption-desorption cycle some of the charcoal adsorbent will become deactivated thus requiring regeneration. The regeneration is carried out by conventional means and is not a part of this invention.

It is preferred to remove acidic gases such as carbon dioxide and hydrogen sulfide from the hydrocarbon feed to the charcoal adsorbent fractionation process by suitable pretreatment of the feed before it enters the adsorption zone in order to minimize metal corrosion and contamination of products.

In the adsorption tower the fluidized adsorbent is handled as a dense fluid phase in which the particles average approximately 30–100 micron in particle size and for the most part are below 200 micron in size. The particles possess considerable motion relative to each other and plates or packing are required in the tower in order to effect sufficient countercurrent contact between the adsorbent and vapor. The tower may be supplied with perforated plates equipped with simple standpipe overflows, the vapor passing upwardly through the plate perforations at a velocity sufficiently high to prevent downward passage of charcoal therethrough and to provide good solids fluidization. Packing or bubble cap plates can also be employed. Approximately 1 to 3 feet of dense bed and 2 feet of vapor disengaging space per plate are adequate to establish a satisfactory approach to equilibrium between vapor and solid.

The invention is generally applicable to fractionation processes of the type illustrated above, involving selective adsorption of one or more components from a mixture containing other components which are more and less readily adsorbed. In such operations it may be used to separate hydrocarbon mixtures into fractions of any desired boiling range or chemical structure by suitable selection of adsorbents and stripping agents in conformity with chromatographic principles. For example, paraffins, naphthenes, olefins, diolefins and aromatics may be obtained as separate fractions from mixtures of two or more of these classes of hydrocarbons with a silica gel adsorbent used in an adsorption process as described above in one or more stages according to the number of fractions to be separated. Similarly, organic vapors of different degrees of polarity may also be separated by selective adsorption on any suitable solid adsorbents.

The process is particularly applicable to the recovery of ethane and $C_3$ hydrocarbons from refinery fuel gas; to the recovery of light ends from low pressure catalytic cracking gases; to the recovery of hydrocarbons and oxygenated compounds from hydrocarbon synthesis gas produced at low pressures; to the separation of methane from nitrogen, and to the recovery of acetylene from the gases of the Wulff process.

What is claimed is:

1. A process for the separation of gaseous components of a mixture comprising a less readily adsorbed component A, a more readily adsorbed component C, and an intermediate component B by means of adsorption by a solid fluidized adsorbent which comprises, passing said fluidized adsorbent downwardly through an adsorption zone having an adsorption section above the gaseous mixture feed-point, and a rectification section below said feed-point, feeding the gaseous mixture to a lower portion of the adsorption section, removing unadsorbed component A from an upper portion of the adsorption zone, refluxing the adsorbent in the upper portion of the rectification section with a gas comprising component B emerging from a lower section of the rectification section, refluxing the adsorbent in the middle portion of the rectification section with a gas comprising component C emerging from the lowermost portion of the rectification section, removing a gas comprising component B from the rectification section, refluxing the adsorbent with steam in the lowermost portion of the rectification section to partially strip a first fraction of component C from the adsorbent, removing a stream comprising component C from a lower portion of the rectification section, removing the adsorbent from the bottom of the rectification section, passing the adsorbent upwardly through a heating zone, heating the adsorbent to a sufficiently high temperature in the heating zone to desorb a second fraction of component C, removing the second fraction of component C, passing the adsorbent into a high temperature steaming zone wherein the adsorbent is countercurrently contacted with steam at a higher temperature than that employed in the lowermost portion of the rectification zone, removing final traces of component C from the adsorbent in the high temperature steaming zone as a third fraction.

2. A process according to claim 1 in which the second and third fractions of component C with associated steam are returned to the lowermost portion of the rectification section.

3. A process according to claim 1 in which the residual steam adsorbed on the hot adsorbent from the high temperature steaming zone is stripped from the adsorbent by countercurrent contact with dry gas comprising component A, cooled and returned to the adsorption zone.

4. A process according to claim 1 in which the gaseous feed is a mixture in which component A comprises methane and lower boiling gases, component B comprises $C_2$ hydrocarbons, and component C comprises $C_3$ hydrocarbons, and in which the solid adsorbent is charcoal.

5. A process according to claim 4 in which the gaseous mixture also contains $C_4$ hydrocarbons which are removed from the adsorbent with the $C_3$ hydrocarbons as constituents of component C.

References Cited in the file of this patent

UNITED STATES PATENTS

| Number | Name | Date |
|---|---|---|
| 1,422,007 | Soddy | July 4, 1922 |
| 1,836,301 | Bechthold | Dec. 15, 1932 |
| 2,384,311 | Kearby | Sept. 4, 1945 |
| 2,446,076 | Campbell et al. | July 27, 1948 |
| 2,470,339 | Claussen et al. | May 17, 1949 |
| 2,493,911 | Brandt | Jan. 10, 1950 |
| 2,519,873 | Berg | Aug. 22, 1950 |
| 2,519,874 | Berg | Aug. 22, 1950 |
| 2,523,149 | Scheeline | Sept. 19, 1950 |

OTHER REFERENCES

"Hypersorption—New Fractionating Process" by C. Berg and W. Bradley, The Petroleum Engineer, May 1947, pages 115–118.